United States Patent [19]

Fesler et al.

[11] 4,193,103

[45] Mar. 11, 1980

[54] MAGNETIC TRANSDUCER HEAD

[75] Inventors: John C. Fesler, Mackinaw; Dennis M. Bell, Hudson, both of Ill.

[73] Assignee: International Tapetronics Corporation, Bloomington, Ill.

[21] Appl. No.: 947,447

[22] Filed: Oct. 2, 1978

[51] Int. Cl.² ............................ G11B 5/22; G11B 5/10
[52] U.S. Cl. ..................................... 360/122; 360/129
[58] Field of Search ............................... 360/122, 129

[56] References Cited

U.S. PATENT DOCUMENTS

| 3,417,386 | 12/1968 | Schneider | 360/122 |
| 3,526,885 | 9/1970 | Anderson | 360/122 |

FOREIGN PATENT DOCUMENTS 1410264  10/1975  United Kingdom ..................... 360/122

*Primary Examiner*—Robert S. Tupper
*Attorney, Agent, or Firm*—McCaleb, Lucas & Brugman

[57] ABSTRACT

A magnetic transducer head having, at the face end wall, at least one pair of transducer pole piece portions extending in the direction of movement of the tape and having a gap between them. The pole pieces are tangent, at the gap, to a base plane parallel to the general direction of movement of the tape. In the example illustrated, the pole piece portions are disposed at approximately 13° relative to the base plane so that the spacing between the pole piece portions and the base plane increases with distance from the gap on both the approach to and retreat from the gap. The casing has a tape guide surface which overlies the pole piece portions at the face end wall and determines the angle of approach to and retreat from the pole piece portions. This guide surface is cylindrical in the example illustrated, providing an approximately 7° angle of approach and retreat of the tape relative to the base plane, this being substantially less than the 13° angle of the pole piece portions themselves. When used with a standard NAB tape cartridge, a pressure pad within the cartridge presses the tape against the 7° guide surface to conform therewith, thereby positively training the tape to approach and retreat from the gap at that angle, independent of the larger approach and retreat angles of the pole pieces themselves. The face wall of the head has a central window through which the gap and immediately adjacent surfaces of the pole piece portions extend into direct contact with the tape. The pole piece portions continue beneath the guide surface on the face wall fore and aft of the leading and lagging edges of the window.

8 Claims, 10 Drawing Figures

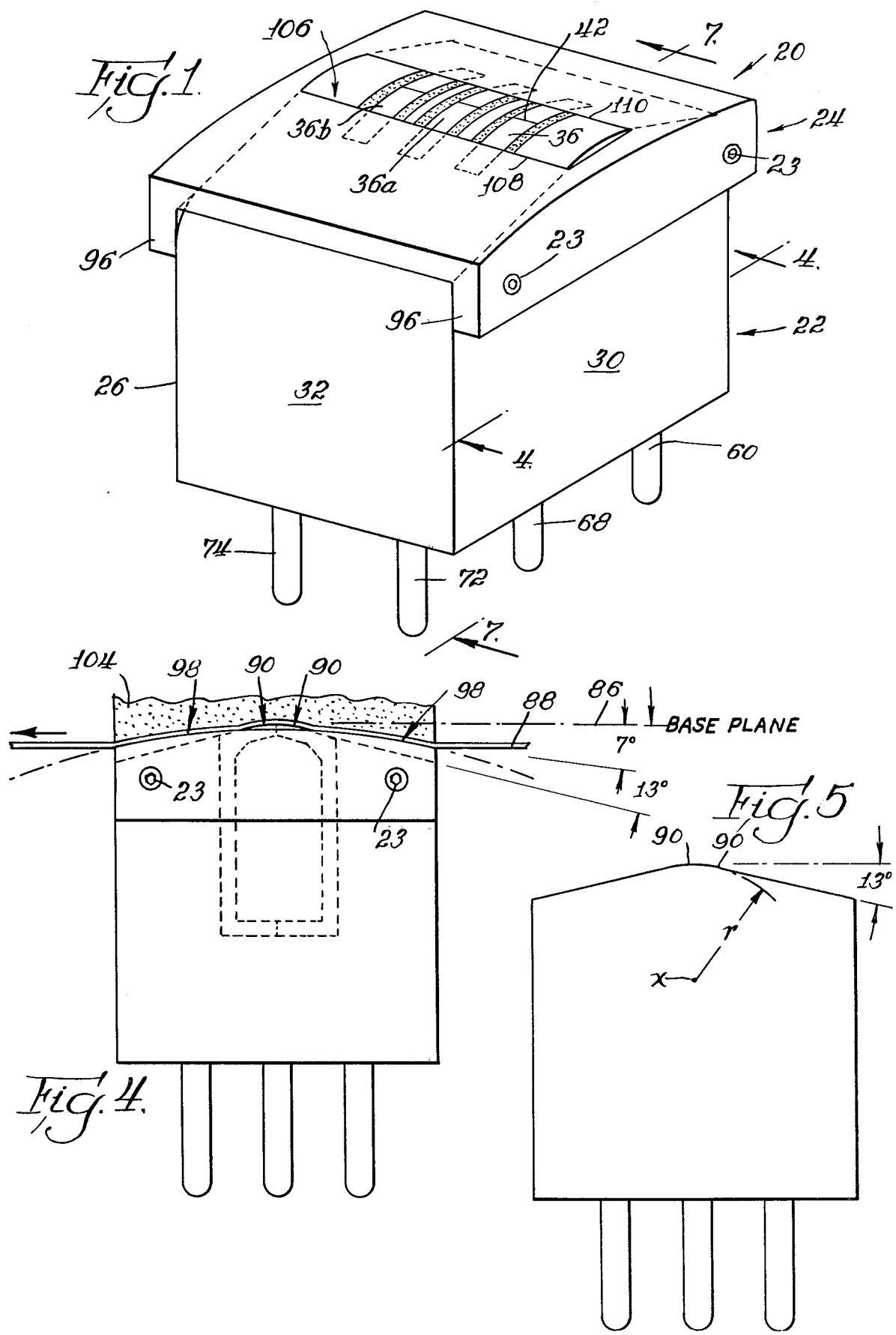

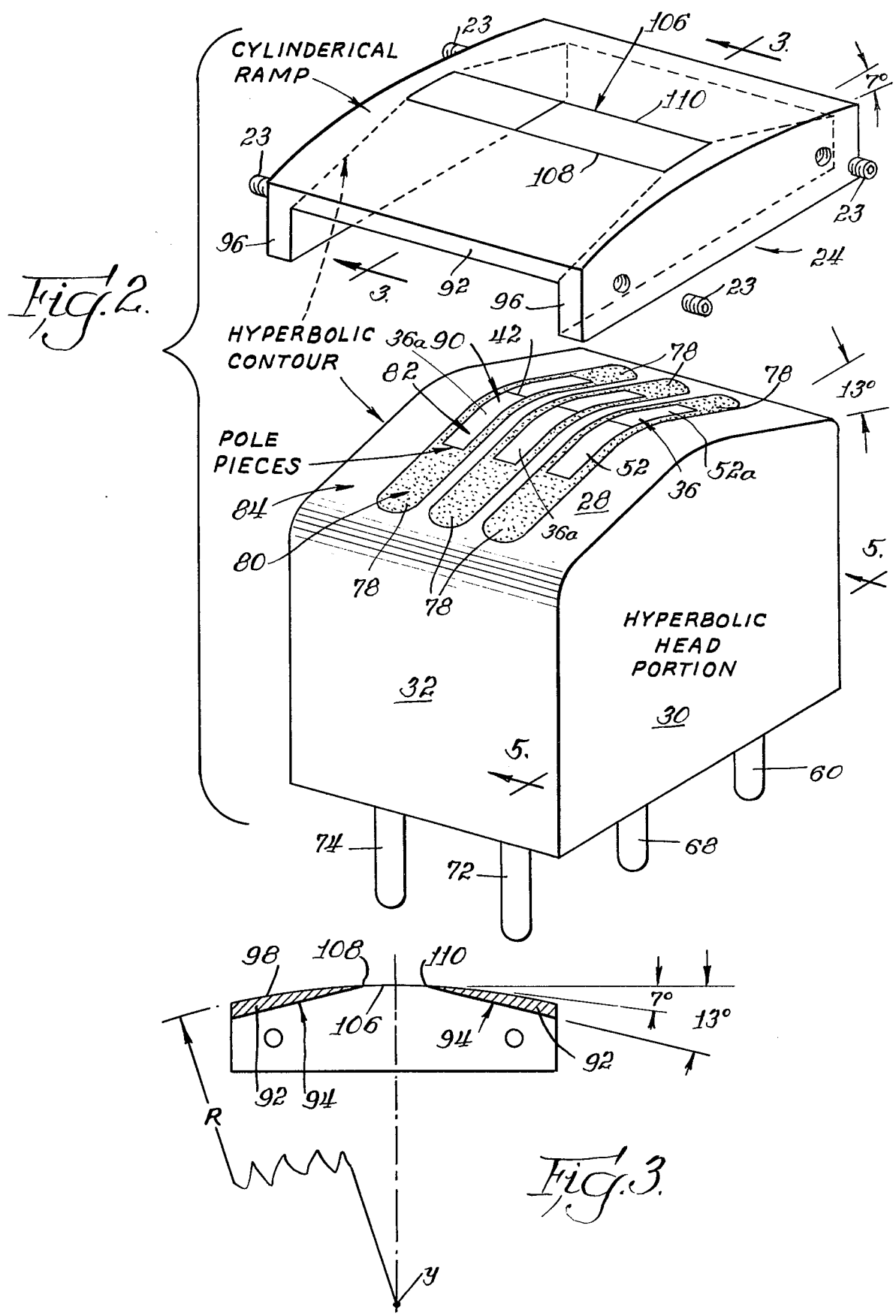

MAGNETIC TRANSDUCER HEAD

BACKGROUND OF THE INVENTION

The invention relates to a magnetic transducer head for cooperating with (that is, transducing) a moving magnetic record medium (such as a magnetic tape) to play back signals along a record path extending in the direction of movement of the record medium.

To describe the improvements resulting from the present invention, it is first necessary to point out some deficiencies of conventional playback heads used for reproduction in an NAB tape cartridge recording and reproducing machine. The conventional head consists of a generally cubic metal casing with the face end wall constructed to resemble a hyperbola. The so-called hyperbolic nose at the face end wall makes excellent contact with the magnetic tape, providing superb high frequency response with minimal losses in the range of 1 to 15 kHz. By contrast, the low frequency response of the hyperbolic head leaves much to be desired when used with the NAB cartridge. Frequencies from 50 to 250 Hz are reproduced erratically, at different levels. There can easily be amplitude variations of ±2.5 decibels or more!

The low frequency response in cartridge machines is definitely inferior to that in open reel machines. After much research, the applicants were able to determine that the differences were due, in part, to the way that the tape wraps about the playback head in a cartridge machine as opposed to the type of wrap encountered in an open reel type player.

In an open reel tape recorder-reproducer, the tape path and its wrap about the face of the head is determined mechanically. Most professional open reel recorders do not have pressure pads, so the angles of approach to, and retreat from, the head face are determined totally by the positions of the tape guide rollers. On the other hand, in a cartridge machine, the tape is pressed against the head face by a compressible pressure pad. The actual wrap and the angles of approach and retreat are influenced by the strength and uniformity of the pressure pad itself which holds the moving tape against the head and conforms it to the approach and retreat angles of the head face. Since no two pressure pads are precisely alike, the results vary from one cartridge to another. This is aggravated by the high approach and retreat angles which are built into the head face of the conventional hyperbolic head. In this conventional head the tape runs along the surfaces of the pole piece portions fore and aft of the gap which surfaces are inclined at a steep angle of approximately 13° from a base plane parallel to the general direction of movement of the tape. In a cartridge machine, the pressure pad within the cartridge presses the tape onto the inclined surfaces, but the 13° angle is too great for the conventional pressure pad to conform the tape consistently to the approach and retreat surfaces. Because conformance is not 100% consistent, low frequency playback is degraded.

SUMMARY OF THE INVENTION

It is a primary object of the present invention to provide a magnetic transducer head which has improved low frequency response over that of the conventional hyperbolic or cylindrical face head.

An object of the invention is to provide a magnetic transducer head in which the pole piece portions are disposed at a predetermined angle relative to a base plane which is parallel to the general direction of movement of the tape, and the casing of the head has guide surface means training the tape for movement across the pole piece portions at a different, lesser angle relative to that base plane.

Another object is to provide, in a magnetic transducer head, guide surface means on the face wall of the casing to train the tape toward and from the gap at a lesser angle than the surfaces of the pole piece portions relative to the base plane.

Another object is to provide in the face wall of such a magnetic transducer head a central window exposing the gap and the immediately adjacent surfaces of the pole pieces.

Another object is to provide such magnetic transducer head in which the gap and immediately adjacent surfaces of the pole piece portions extend through that window for direct contact with the moving tape.

Another object is to provide such a magnetic transducer head in which the angle of the pole piece portions relative to the base plane is about 13° and the angle of the tape guide surfaces on the casing is substantially less, preferably in the neighborhood of 7°.

Another object is to provide such a magnetic transducer head in which the pole piece portions approach toward and retreat from the gap at a predetermined angle greater than that of the tape guide surfaces on the casing overlying the pole piece portions, the gap and immediately adjacent pole piece portions extending through a window in the tape guide surfaces on the casing, and the pole piece portions continue fore and aft of the leading and lagging edges of the window at that same predetermined angle.

Another object is to provide such a magnetic transducer head having pole piece portions with a hyperbolic contour, and tape guide surfaces which are cylindrical in contour overlying the pole piece portions.

Other objects and advantages will be apparent from the following description taken in connection with the drawings.

BRIEF DESCRIPTION OF THE DRAWINGS

FIG. 1 is a perspective assembly view of a twopiece embodiment of a magnetic transducer head employing the principles of the present invention;

FIG. 2 is an exploded perspective view of FIG. 1;

FIG. 3 is a vertical cross-sectional view of the upper cap portion shown in FIG. 2, taken along line 3—3;

FIG. 4 is a side view of FIG. 1 taken in the direction of arrows 4—4 (FIG. 4 can also be considered a fragmentary, enlarged view of FIG. 6);

FIG. 5 is a side view of the head portion shown in FIG. 2, taken in the direction of arrows 5—5;

Like parts are referred to by like reference characters throughout the figures of the drawings.

DETAILED DESCRIPTION OF THE PREFERRED EMBODIMENTS

Figure 6:
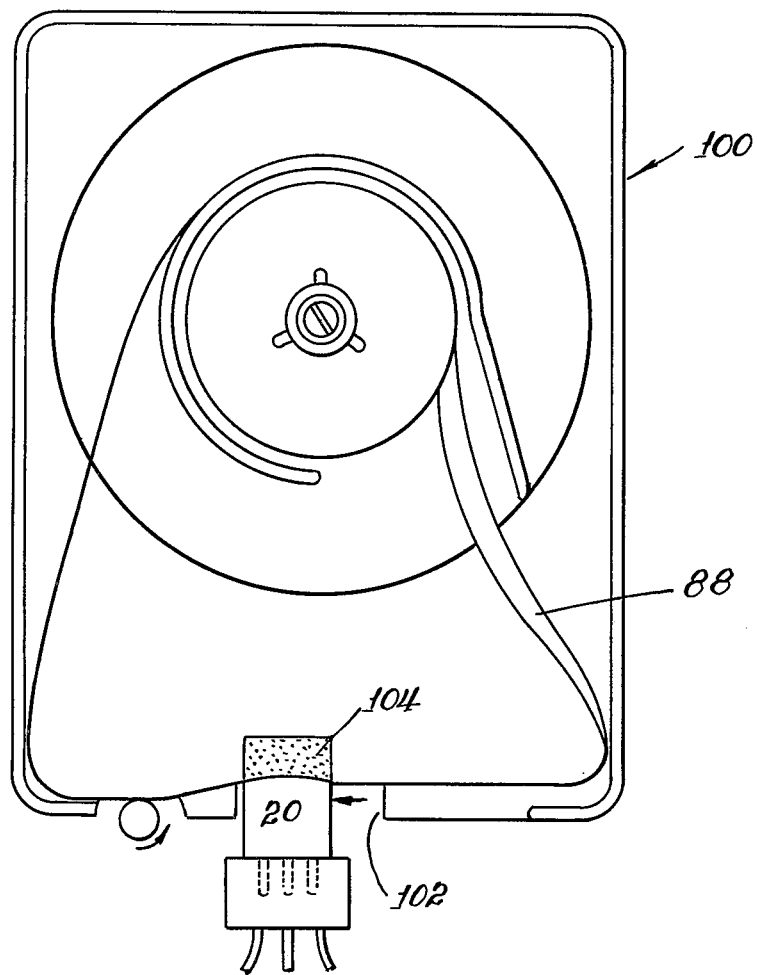
FIG. 6 is a transducer head according to the present invention, shown in playing position engaging the tape in a standard NAB cartridge.

Referring first to the two-piece embodiment shown in FIGS. 1-7, the magnetic transducer head is generally designated 20. It comprises a head portion 22 and a cap portion 24.

The head portion 22 is not limited to any particular form. In the present case, it is illustrated as a conventional head with a face contour nominally called "hyperbolic" although it is not literally in the shape of a geometrical hyperbola. It comprises a cubic metal casing 26 with a face wall 28, side walls 30, 30, end walls 32, 32, and bottom or base wall 34.

Figure 7:
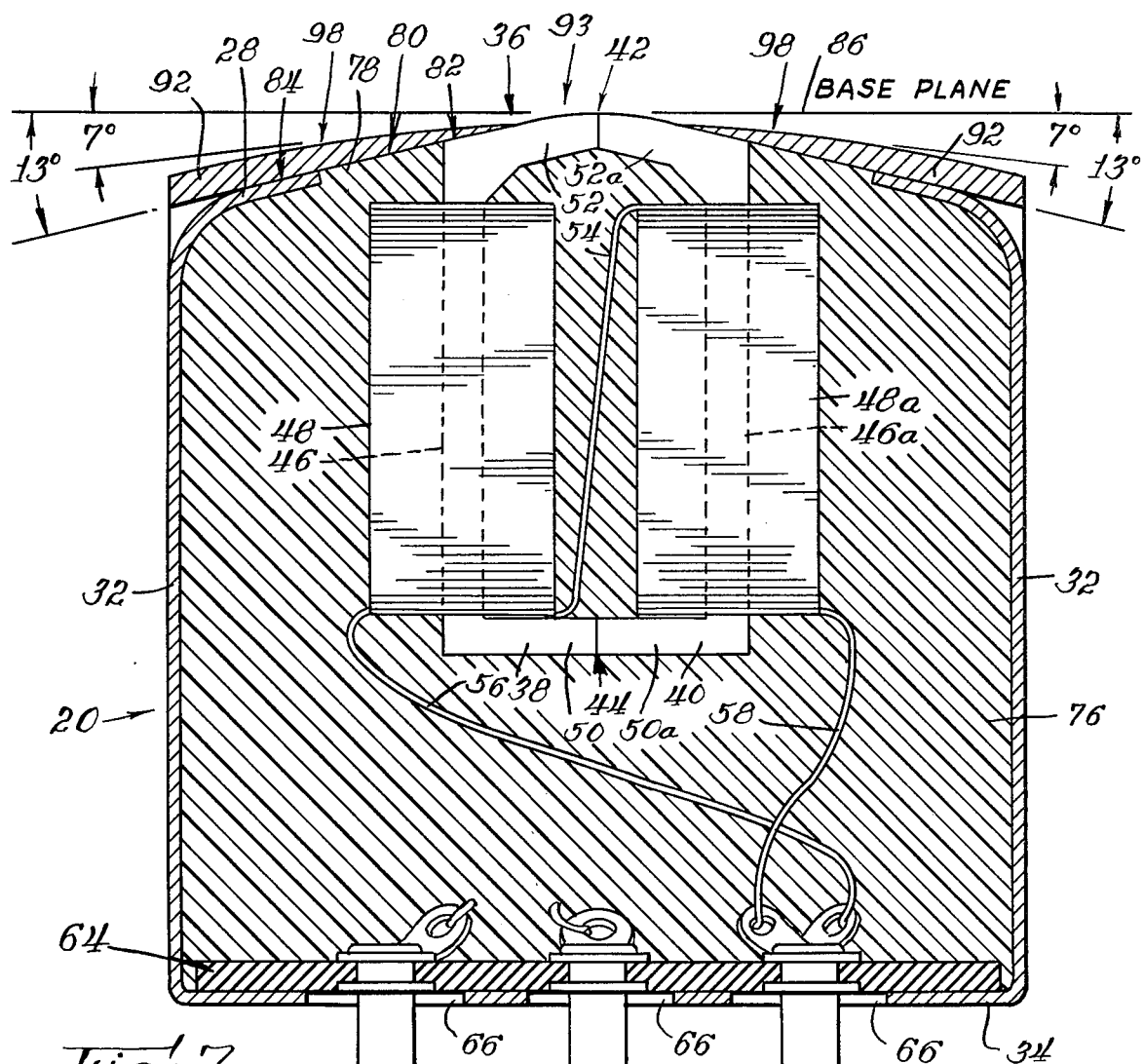
FIG. 7 is an enlarged cross-sectional view of FIG. 1 taken along line 7—7.

The present embodiment is a 3-track head having three ring-type core elements 36, 36a, and 36b. Each core element is made, in the usual way, of laminations of magnetic material formed, for manufacturing convenience, in identical, generally C-shaped, fore and aft halves 38 and 40 (FIG. 7). They are joined at a front gap 42 and a back gap 44 into a unit having a generally O-shape. A continuous magnetic flux path includes side leg portions 46, 46a enclosed by coils 48, 48a, back leg portions 50, 50a fore and aft of the back gap 44, and fore and aft pole piece portions 52, 52a. The coils are interconnected by a conductor 54 and are connected at their ends by conductors 56 and 58 to the usual external pins 60, 62. The pins are mounted in an insulating board 64 and extend through openings 66 in the base wall 34. Core elements 36a and 36b are identical, having interconnected coils connected respectively to pins 68, 70 and 72, 74. The interior of the casing, if desired, may be potted with epoxy plastics material 76, filling all the voids therein.

Figure 9:
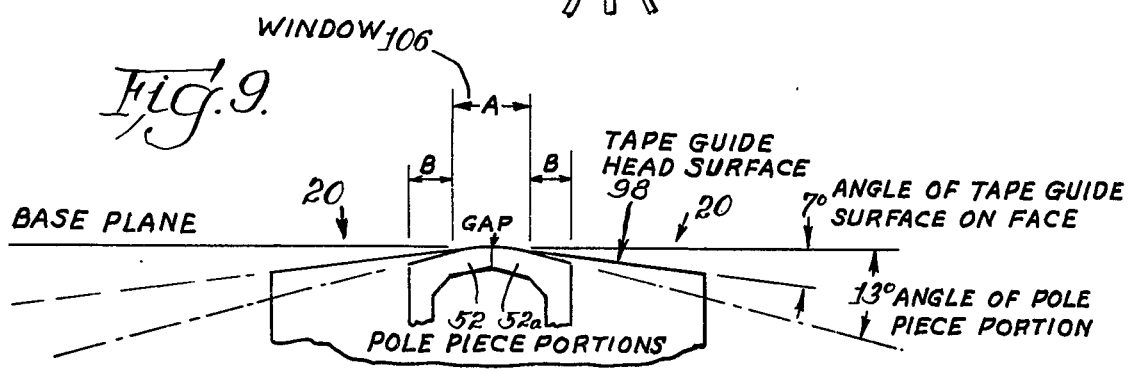
FIG. 9 is a schematic view showing the basic principles of the improved transducer head.

The head portion 22 has three elongated openings 78 in the face wall 28, one for each of the core elements. As shown in side view in FIG. 7, some of the epoxy potting material 76 extends into the opening 78 having outer surfaces 80 flush with outer surfaces 82 of the pole piece portions, and outer surfaces 84 of the face wall 28, all inclined at approximately 13° relative to a base plane 86, both fore and aft of the gap 42. As best seen in FIGS. 4, 7 and 9, the base plane extends parallel to the general direction of movement of the tape 88. In the drawings, the base plane is shown tangent to the gap 42. The pole piece portions immediately adjacent the gap 42 having cylindrical surfaces 90. As shown in FIG. 5, these cylindrical surfaces are struck on a radius r about a center x in a central plane through the head. This slight curvature of the surfaces 90 minimizes wear on the head as well as wear on the oxide coating on the tape.

The cap portion 24 has a transverse wall 92, the under-surface 94 of which is inclined at 13° fore and aft of the gap 42 to conform snugly with the 13° top surfaces 80, 82 and 84 of the head portion. The cap portion 24 also has two straight, side flanges 96 which grip the side walls 30 of the head portion with a snug fit and are held frictionally onto the head portion by socket head set screws 23. If desired, the head and cap portions may be soldered or brazed together. The outer, guide surface 98 of the wall 92 is cylindrical, having a radius R struck about a center y as shown in FIG. 3.

Referring to FIGS. 4 and 6, when the magnetic transducer head 20 is used with a standard NAB cartridge 100, the head is inserted through an opening 102 in the cartridge case where the outer guide surface 98 of the cap portion, and the nose surfaces 90 of the head portion press the tape 88 against an elastromeric pressure pad 104 which is a permanent component of the cartridge. The pressure pad conforms the tape to the cylindrical nose surfaces 90 of the head portion extending through a central window 106 in the cap portion wall 92. It also conforms the tape to the cylindrical approach and retreat surfaces 98 on the cap portion, as shown in FIG. 4. The approach and retreat angles of the pole piece portions 52, 52a are predetermined by the inclined outer surfaces 82 which are flush with the outer face end surface 84 of the head portion, being approximately 13° relative to the base plane 86; and the approach and retreat angles of the tape relative to the base plane as determined by the cylindrical surfaces 98 are substantially less, in this case about 7°. Although this specific arrangement enables the head to perform exceptionally well, giving a nearly flat response throughout the entire frequency range from 20 Hz to 20 kHz, it should be understood that the invention is not limited to this specific combination of approach and retreat angles.

A feature of the present invention which is important in low frequency reproducing is that the surfaces 82 of the pole piece portions 52, 52a continue beneath the wall 92 for a substantial distance fore and aft of the leading and lagging edges 108 and 110 of the window, before turning abruptly away from the face along legs 46, 46a. This enables the tape to contact the apex of the pole pieces during the reproducing mode, and smoothly enter to and exit from this condition of intimate contact.

Figure 8:
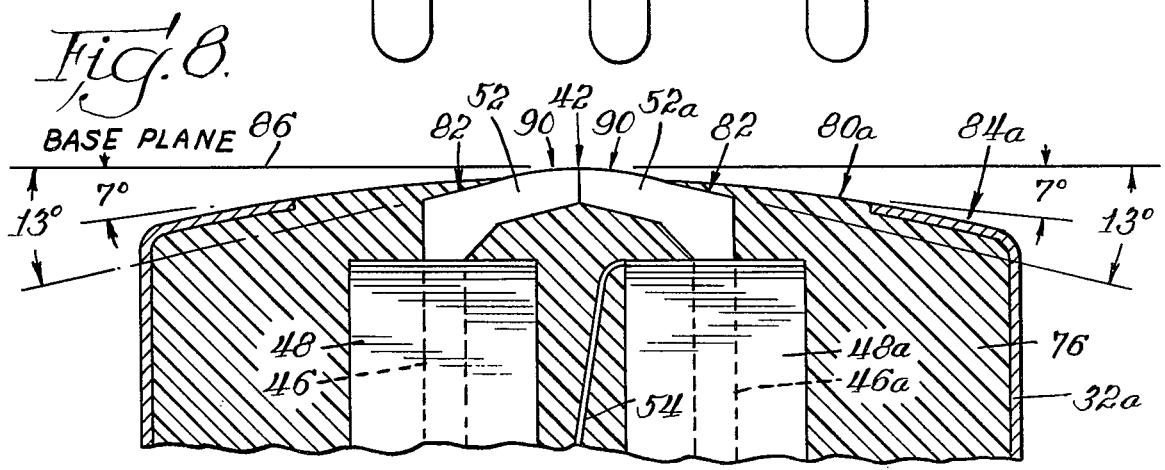
FIG. 8 is a fragmentary view, similar to FIG. 7, of an alternative, one-piece embodiment.

An alternate, one-piece, form of the present invention is shown in FIG. 8. Here, the casing wall 32a is slightly longer than the corresponding wall in the previously described embodiment, and the top surface 84a of the metal casing, and surface 80a of the epoxy material, are ground on a cylindrical contour similar to surface 98 in the previous figures. Remaining parts of the head are the same, including the pole piece portions 52, 52a and are designated by the same reference figures as in FIG. 7.

FIG. 9 summarizes in schematic form important principles of the present invention. The pole piece portions are inclined at substantial approach and retreat angles (13° in the example) relative to the base plane which is parallel to the general direction of travel of the tape, and which is substantially tangent to the gap. The outer tape guide head surface 98 along which the tape moves has a substantially smaller approach and retreat angle (7° in the example). The window 106 has a width A enabling the gap and adjacent pole piece surfaces to extend through it for direct contact with the tape. And the pole piece portions underlie the tape guide head surface 98 a distance B fore and aft of the leading and lagging edges of the window.

Figure 10:
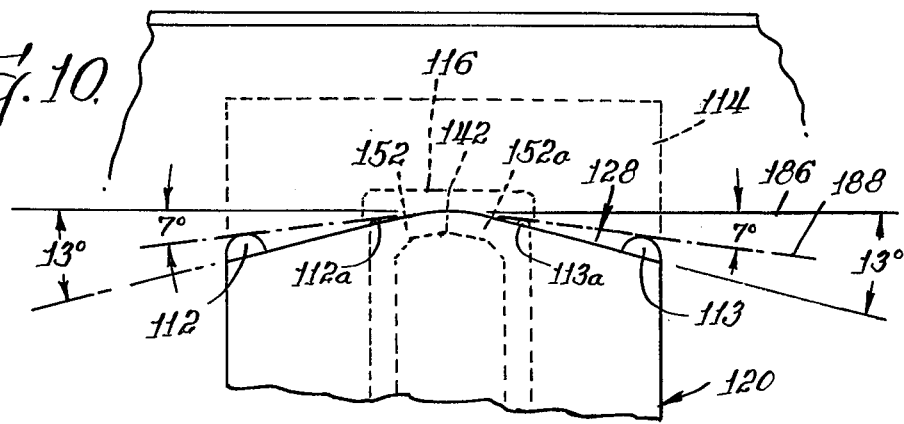
FIG. 10 is another embodiment of the invention.

FIG. 10 illustrates a third embodiment of the invention. It comprises a head 120 similar to head 20 with a front face 128 and pole piece portions 152/152a inclined at approximately 13° fore and aft of the gap 142. Rounded surface guide bars 112, 112a and 113, 113a are soldered or brazed to the casing front face. The thickness of these guide bars above the head face trains the tape at approximately 7° fore and aft of the gap. Among other applications, this third embodiment may be used in an open reel machine or with a cartridge having a special pressure pad modified for use with the bars. One such special pressure pad is designated 114, being shown in broken lines in FIG. 10, having a recessed center 116.

It is thought that the invention and many of its attendant advantages will be understood from the foregoing description, and it will be apparent that various changes may be made in the form, construction and arrangement of the parts and the method employed without departing from the spirit and scope of the invention or sacrificing all of its material advantages, the forms and the methods hereinbefore described being merely preferred embodiments thereof.

The embodiments of the invention in which an exclusive property or privilege is claimed are defined as follows:

1. A magnetic transducer head, cooperable with a moving magnetic tape to play back signals on a record track along the tape, comprising:

a casing having a front wall across which the tape is moveable;

core means within said casing having a pair of pole pieces extending in the direction of movement of the tape and having spaced inner abutting ends forming a transducing gap which projects outside said front wall of said casing for direct contact with said tape, said pole pieces having outer ends remote from the gap connected respectively to a pair of side legs;

each of said pole pieces having a front face extending smoothly and without abrupt discontinuity between the inner and outer ends thereof, each said front face being inclined at one predetermined angle relative to a base plane parallel to the general direction of movement of the tape so that the spacing therebetween increases with distance from the gap; and said casing having guide surface means training a tape for movement across each pole piece at a second predetermined angle less than said one predetermined angle relative to said base plane;

whereby the spacing between the tape and the front faces of the pole pieces increases smoothly and without abrupt discontinuity between the gap and the inner and outer ends of each of the respective front faces.

2. A magnetic transducer head according to claim 1 in which said guide surface means comprises a front wall of said casing overlying the outer end portions of the front faces of the pole pieces remote from the gap.

3. A magnetic transducer head according to claim 2 in which said front wall of the casing has a central window exposing said gap and said inner end portions of the front faces of the pole pieces.

4. A magnetic transducer head according to claim 3 in which said inner end portions of the front faces immediately adjacent the gap are cylindrical and extend forwardly through said window for improved contact with the tape.

5. A magnetic transducer head according to claim 3 in which said front faces of said pole pieces extend beneath the front wall of the casing fore and aft of the leading and lagging edges of the window.

6. A magnetic transducer head according to claim 2 in which said front wall of the casing is cylindrical in contour.

7. A magnetic transducer head according to claim 6 in which the front faces of the pole pieces are formed with flat angular surfaces remote from the gap tangentially joining the cylindrical surfaces immediately adjacent the gap.

8. A magnetic transducer head according to claim 1 in which the dimension between the outer ends of the pole pieces exceeds the wavelength of the minimum frequency to be reproduced at uniform amplitude.

* * * * *